Patented Dec. 27, 1949

2,492,189

UNITED STATES PATENT OFFICE 2,492,189

3,17-DIHYDROXY-11-KETOPREGNINES-20 AND PROCESS

Lewis H. Sarett, Princeton, N. J., assignor to Merck & Co., Inc., Rahway, N. J., a corporation of New Jersey No Drawing. Original application July 14, 1945, Serial No. 605,194. Divided and this application February 23, 1946, Serial No. 649,761

8 Claims. (Cl. 260—397.4)

This invention is concerned generally with novel chemical compounds of the cyclopentanodimethylpolyhydrophenanthrene series and to processes of preparing same; more particularly it relates to novel compounds useful as intermediates in the synthesis of the adrenal cortical hormone Δ4,5-3,11,20-triketo-17(β), 21-dihydroxy pregnene. This application is a divisional of copending application Serial No. 605,194 filed July 14, 1945, now abandoned.

This hormone is known to occur naturally in the adrenal cortex; it has the structural formula:

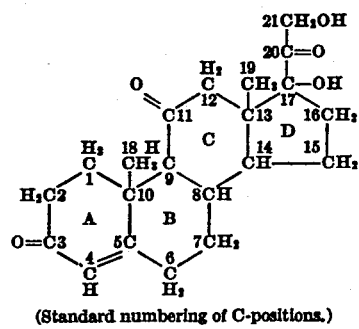

(Standard numbering of C-positions.)

This formula, for purposes of convenience, is hereinafter reproduced below in the abbreviated form:

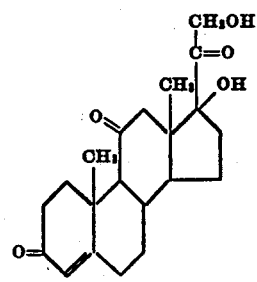

In the following description of the invention, the stereochemical relationships of substituents are indicated by the following conventions:

1. A substituent at the C-3 position which is trans to the C-10 methyl group is parenthetically designated (α).
2. A substituent at the C-17 position, the stereochemical configuration of which is identical with that of the naturally occurring adrenal hormones, is parenthetically designated (β); the epimeric configuration is designated (α). In the structural formulae the former configuration is shown by writing the C-17 substituent (hydroxyl) to the right of the C-17 carbon side chain, thus

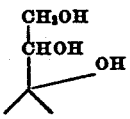

in the latter case above the side chain, thus

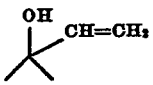

3. The stereochemical relationship of rings A and B is indicated in the formulae by a solid line representing the valence bond in the cis configuration.

In accordance with the present invention it is now found this hormone can be synthesized by reactions indicated as follows:

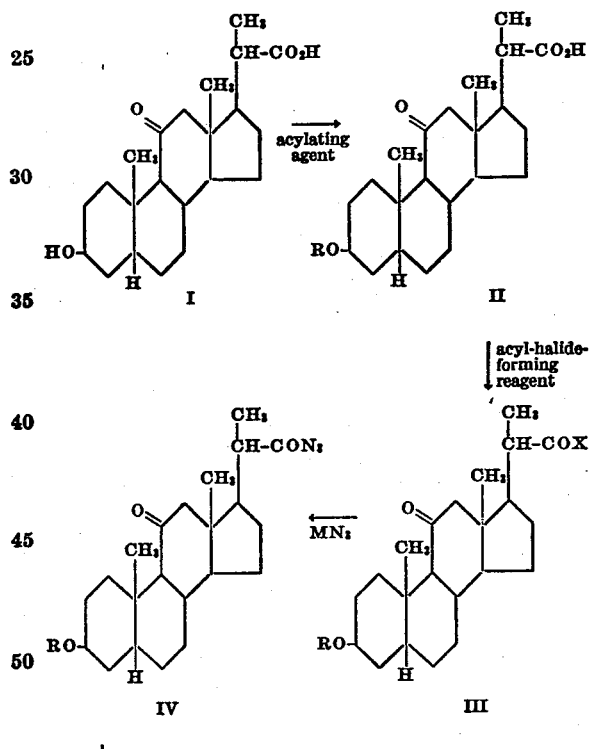

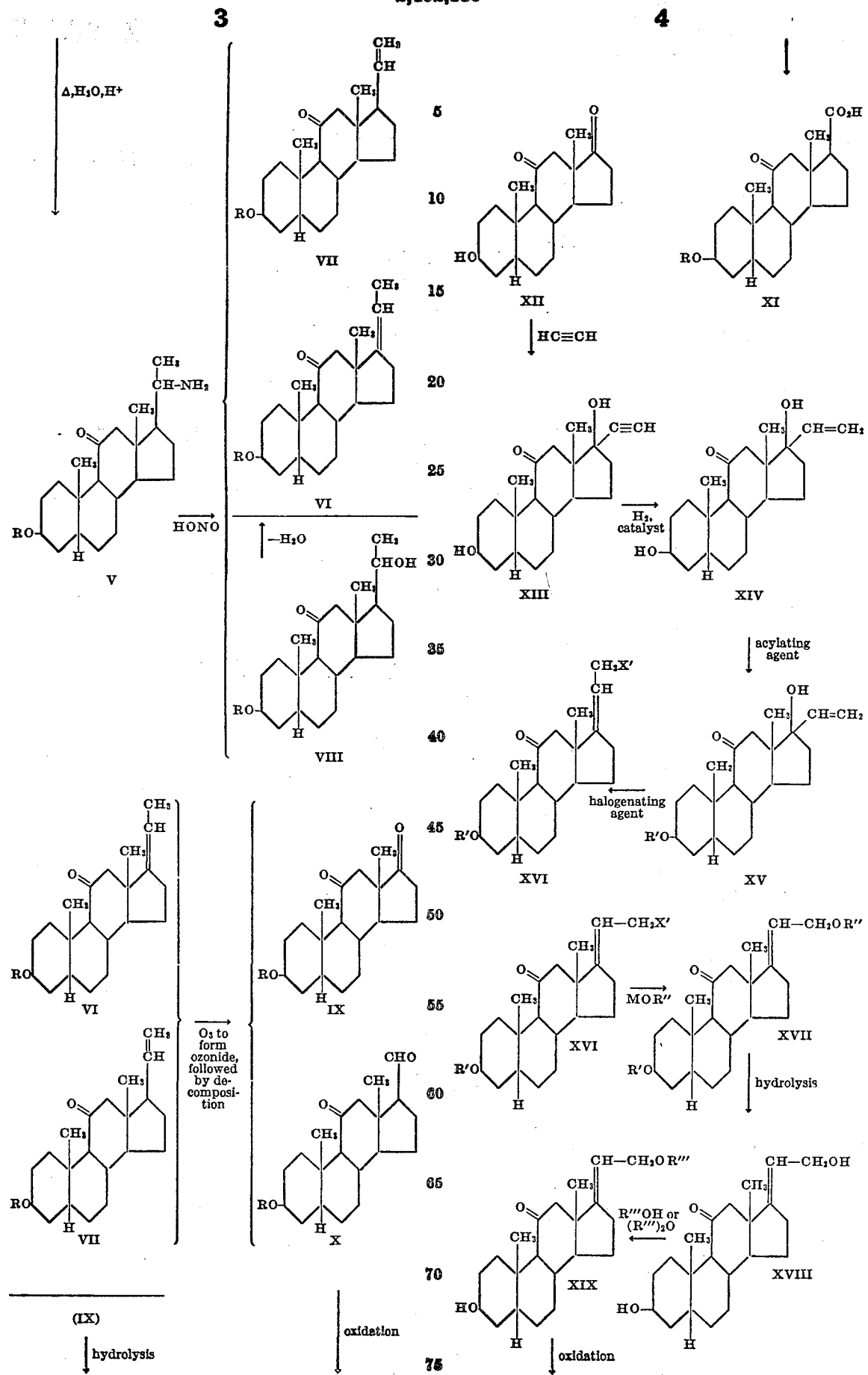

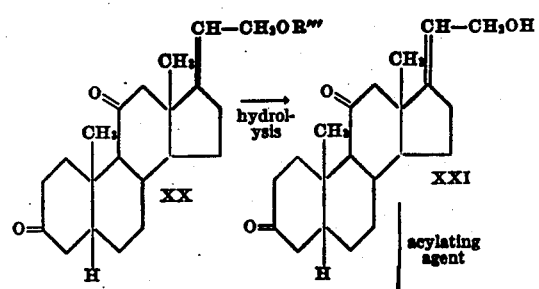
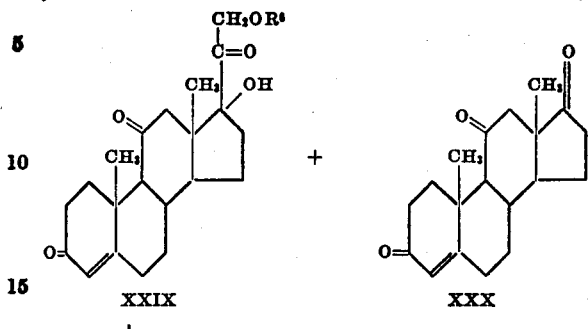
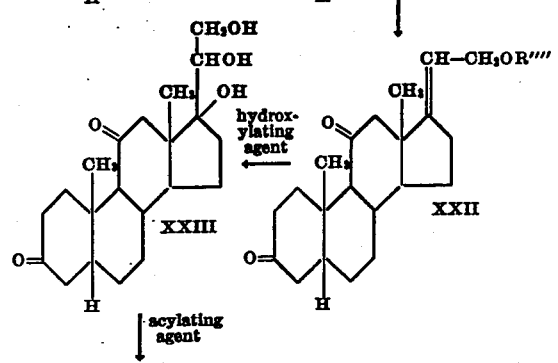
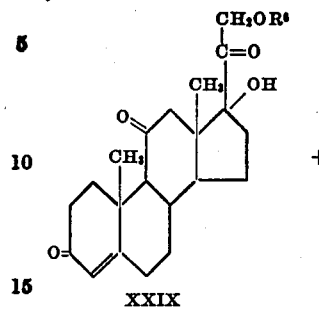
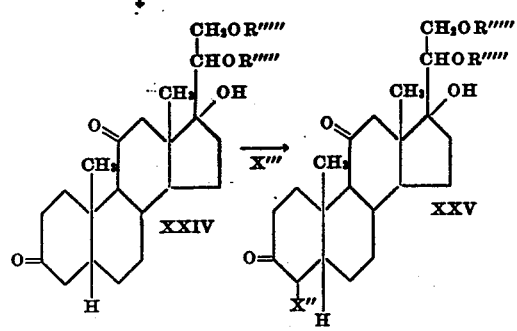
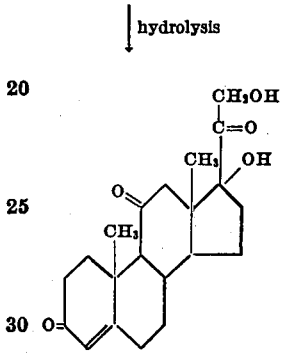
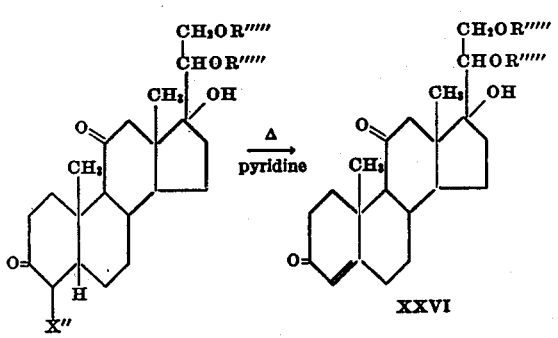
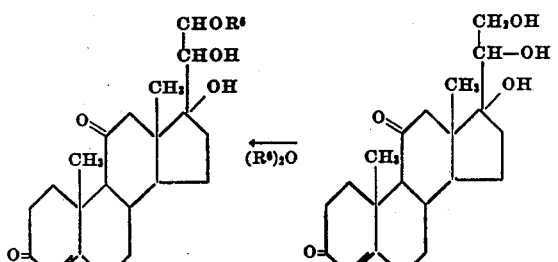

In the above formulae, R, R', R'', R''', R'''', R''''', and $R_6$ are acyl; X, X' and X'' are halogen; and M is an alkali metal or an alkaline earth metal/2.

The reactions above indicated are conducted as follows:

3-hydroxy-11-keto-bisnorcholanic acid (I) is aclylated producing 3-acyloxy-11-bisnorcholanic acid (II) which is treated with an agent capable of converting an organic carboxylic acid to the corresponding acid halide, thus forming the acid halide of 3-acyloxy-11-keto-bisnorcholanic acid (III). Upon treatment of this acid halide with an alkali metal azide or alkaline earth metal azide, the azide of 3-acyloxy-11-keto-bisnorcholanic acid (IV) is formed. Decomposition of this azide with an acidic aqueous solution produces 3-acyloxy-11-keto-20-aminopregnane (V).

Upon treatment of this compound (V) with nitrous acid, a mixture containing predominantly $\Delta^{17,20}$-3-acyloxy-11-keto-pregnene (VI) and $\Delta^{20,21}$-3-acyloxy-11-keto-pregnene (VII and a minor amount of 3-acyloxy-11-keto-20-hydroxypregnane (VIII) results. The proportion of the desired compound (VI) present in this mixture can be increased by treating the mixture with an aromatic sulfonyl halide followed by further treatment with a base to cause removal of the elements of the coresponding aromatic sulfonic acid. The mixture of these compounds (VI) and (VII) or of (VI), (VII) and (VIII), is then treated with ozone followed by decomposition of the ozonide, producing 3-acyloxy-11,17-diketoetiocholane (IX) and 3-acyloxy-11-keto-17-formyletiocholane (X). Compound (X) is oxidized to 3-acyloxy-11-ketoetiocholanic acid (XI) which is separated from compound (IX) by extraction with alkali.

Compound (IX) is hydrolyzed to form 3-hydroxy-11,17-diketoetiocholane (XII) which is treated with acetylene to form 3,17-dihydroxy-11-keto-pregnine-20 (XIII). This compound (XIII) is catalytically hydrogenated to produce $\Delta^{20,21}$-3,17 - dihydroxy - 11 - ketopregnene (XIV) which is acylated to form $\Delta^{20,21}$-3-acyloxy-17-hydroxy-11-ketopregnene (XV), and this compound is halogenated to produce $\Delta^{17,20}$-3-acyloxy-11-keto-21 - halopregnene (XVI). When treated with an alkali metal salt or alkaline earth metal salt of an organic acid, this compound yields $\Delta^{17,20}$ - 3,21-diacyloxy - 11 - ketopregnene (XVII) which is hydrolyzed producing $\Delta^{17,20}$-3,21-dihydroxy-11 - ketopregnene (XVIII). The latter product (XVIII) is partially esterified and the mono ester (XIX) thus produced is oxidized to convert the unesterified hydroxy group in the 3 position to a keto group, thereby yielding the ester of $\Delta^{17,20}$-3,11-diketo-21-acyloxy-pregnene (XX). This product (XX) is hydrolyzed and the $\Delta^{17,20}$ - 3,11 - diketo - 21 - hydroxypregnene (XXI) thus formed is acylated producing $\Delta^{17,20}$-3,11-diketo - 21 - acyloxypregnene (XXII). Hydroxylation at the unsaturation of the last mentioned compound (XXII) results in the production of 3,11 - diketo - 17($\beta$),20,21-trihydroxypregnene (XXIII) which is then acylated to form 3,11-diketo-17($\beta$)-hydroxy-20,21 - diacyloxypregnene (XXIV). When brominated, this compound yields 3,11-diketo-4-bromo-17($\beta$)-hydroxy-20,21-diacyloxypregnene (XXV).

This compound is then treated with a reagent capable of removing the elements of hydrogen bromide, thereby producing $\Delta^{4,5}$-3,11-diketo-17($\beta$)-hydroxy-20,21-diacyloxypregnene (XXVI) which on hydrolysis forms $\Delta^{4,5}$-3,11-diketo-17-($\beta$),20,21-trihydroxypregnene (XXVII). Partial acylation of this compound (XXVII) gives $\Delta^{4,5}$-3,11 - diketo - 17($\beta$),20 - dihydroxy - 21 - acyloxypregnene (XXVIII) which, when oxidized, yields a mixture of $\Delta^{4,5}$-3,11,20-triketo-17($\beta$)-hydroxy-21-acyloxypregnene (XXIX) and $\Delta^{4,5}$-3,11,17-triketo androstene (XXX). Compounds (XXIX) and (XXX) may be separated by conventional operations, for example chromatography, and compounds (XXIX) hydrolyzed to produce the desired adrenal hormone, $\Delta^{4,5}$-3,11,20-triketo-17-($\beta$),21-dihydroxypregnene.

This invention is concerned with compounds having basic structural formulae of the type illustrated by above intermediate 13, together with processes of producing same, which intermediate is represented by the formula

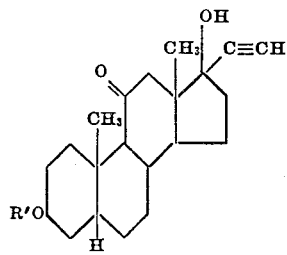

in which R' is acyl or hydrogen.

The starting materials employed in the processes according to this invention, 3-hydroxy-11,17-diketoetiocholane or an acyl derivative thereof, may be obtained as described in copending application Serial No. 649,760, filed February 23, 1946.

In accordance with this invention 3-hydroxy-11,17-diketoetiocholane or an acyl derivative thereof, is treated with acetylene and an alkali metal or alkali metal compound capable of replacing one or both of the hydrogen atoms of acetylene with the alkali metal, whereby the 17-keto substituent is converted to a substituent of the form:

The reaction preferably is conducted in liquid ammonia or in a tertiary alcohol. If the 3-hydroxy compound is to be converted to the corresponding 3-acyloxy compound, the acyl radical may be introduced by esterifying the 3-hydroxy compound with an acid such as acetic, propionic, butyric, valeric, caproic, capric, etc., benzoic, toluic, or phenylacetic, or by use of anhydrides of such acids. The preferred acylating agents are the anhydrides of the lower aliphatic acids, i. e. those having 6 carbons or less, particularly acetic anhydride. The alkali metal used in effecting the acetylene reaction with the keto compound may be potassium, sodium, lithium, rubidium, cesium; alkali metal compounds that may be used include alkali metal amides, alkali metal hydrides, alkali metal salts of a tertiary alcohol such as the tertiary butyl alcohol or tertiary amyl alcohol, or may be sodium triphenyl methyl.

When practicing the process according to this invention, the product obtained is 3,17-dihydroxy-11-ketopregnine-20 whether the 3-hydroxy or 3-acyloxy compound is treated with acetylene as described. The structural formula of this product is as follows:

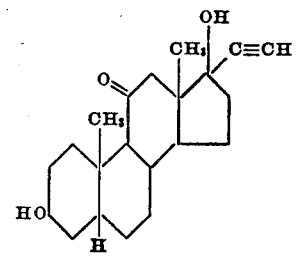

By esterification of this compound as above mentioned, the corresponding 3-acyloxy compounds are formed.

The following example, wherein 3($\alpha$)-hydroxy-11,17-diketoetiocholane is converted to 3($\alpha$), 17-($\alpha$)-dihydroxy-11-ketopregnine-20 is one application of the presently invented process to specific reactants, but it will be understood that this example is for purposes of illustration and that the invention is not limited thereto.

Example

To 30–35 cc. of liquid ammonia in a flask, cooled in a dry ice bath, is added 1.3 grams of potassium metal. Pure dry acetylene is then passed through until the mixture is decolorized. A solution of .5 gram of 3($\alpha$)-hydroxy-11,17-diketoetiocholane in a mixture of 10 cc. of absolute dioxane and 10 cc. of absolute ether is then added. The ammonia is permitted to evaporate, 17 cc. of absolute ether added, and the suspension is closed off from the air and left to stand at room temperature overnight. The reaction mixture is poured into 3% sulfuric acid, extracted with ether, the ether extract washed with dilute potassium carbonate and water, the ether removed on the steam bath and the residue crystallized from ethyl acetate. The pure product, 3($\alpha$),17-($\alpha$)-dihydroxy-11-ketopregnine-20, was obtained in about 85% yield, had a melting point 218.5°–219.0° C. $[\alpha]_D = 9.4°$ (acetone).

8 mg. of pure 3($\alpha$),17($\alpha$)-dihydroxy-11-ketopregnine-20 was treated with one drop of acetic anhydride and two drops of pyridine at 100° for ten minutes. Water was added; the mixture was extracted from ether. The ethereal solution was washed successively with dilute hydrochloric acid, dilute potassium carbonate and with water. The ethereal solution was evaporated to dryness and the residue was crystallized from ether-petroleum ether. The 3(α) - acetoxy - 17(α) - hydroxy-11-ketopregnine was obtained in about 95% yield; it had a melting point of 186°–189° C. Other acyl derivatives of the hydroxy compound can be prepared by substituting other acylating agents for the acetic anhydride above mentioned.

While in the above example the starting material used was a compound wherein the 3-hydroxy substituent was in the trans form, however a compound having the 3-hydroxy substituent in the cis form may be used as the stearic configuration of the hydroxy group is not important.

The temperatures mentioned in the above example are room temperatures unless otherwise indicated. The temperatures, however, are not critical and the reactions may be carried out at higher or lower temperatures; but extremely high temperatures should be avoided because of the likelihood of decomposition of the desired products which results from operation at such temperatures.

Unless otherwise stated, the reagents can be used in different proportions than are indicated in the above example; the proportions unless otherwise indicated, are not critical provided enough of the reagents is employed to assure substantially complete reaction to produce the desired products.

All melting points in this specification are corrected.

Since certain changes in carrying out the above process, and certain modifications in the intermediates which embody the invention may be made without departing from the scope of the invention, it is intended that all matter contained in the above description shall be interpreted in an illustrative and not in a limiting sense.

What is claimed is:

1. A compound of the cyclopentanoperhydrophenanthrene series having the basic structural formula:

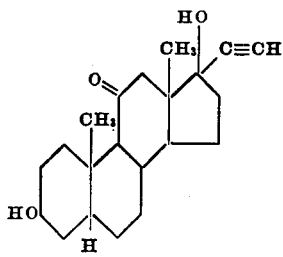

2. A compound of the cyclopentanoperhydrophenanthrene series having the basic structural formula:

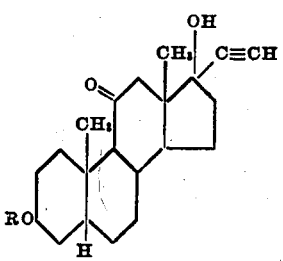

wherein R is an acetyl group.

3. The process that comprises treating a compound of the cyclopentanoperhydrophenanthrene series having the basic structural formula:

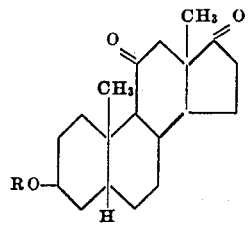

where in R is of the class consisting of hydrogen and lower aliphatic acyl, with acetylene and a substance of the class consisting of alkali metals, and obtaining a compound having the basic structural formula:

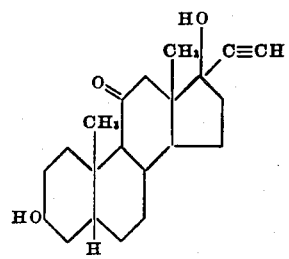

4. The process that comprises treating a compound of the cyclopentanoperhydrophenanthrene series having a keto-substituent in each of the 11 and 17 positions, with acetylene and an alkali metal, and obtaining a corresponding compound of said series having an 11-ketone substituent and a 17-position substituent of the form:

5. The process that comprises treating 3-hydroxy-11,17-diketoetiocholane with acetylene and an alkali metal and obtaining 3,17-dihydroxy-11-ketopregnine 20.

6. The process that comprises treating 3-hydroxy-11,17-diketoetiocholane with acetylene and potassium and obtaining 3,17-dihydroxy-11-ketopregnine-20.

7. The process that comprises treating in liquid ammonia 3 - hydroxy - 11,17 - diketoetiocholane with acetylene and potassium and obtaining 3,17-dihydroxy-11-ketopregnine-20.

8. The process that comprises treating 3(α)-hydroxy-11,17-diketoetiocholane with acetylene and potassium in liquid ammonia, and obtaining 3(α),17(α)-dihydroxy-11-ketopregnine-20.

LEWIS H. SARETT.

REFERENCES CITED

The following references are of record in the file of this patent:

UNITED STATES PATENTS

| Number | Name | Date |
|---|---|---|
| 2,267,257 | Ruzicka | Dec. 23, 1941 |